US008521983B2

(12) United States Patent
Ogihara et al.

(10) Patent No.: US 8,521,983 B2
(45) Date of Patent: Aug. 27, 2013

(54) PROGRAM, APPARATUS AND METHOD FOR MANAGING DATA ALLOCATION OF DISTRIBUTED STORAGE SYSTEM INCLUDING STORAGE NODES

(75) Inventors: Kazutaka Ogihara, Kawasaki (JP); Yasuo Noguchi, Kawasaki (JP); Yoshihiro Tsuchiya, Kawasaki (JP); Masahisa Tamura, Kawasaki (JP); Tetsutaro Maruyama, Kawasaki (JP); Kazuichi Oe, Kawasaki (JP); Takashi Watanabe, Kawasaki (JP); Tatsuo Kumano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 236 days.

(21) Appl. No.: 12/546,440

(22) Filed: Aug. 24, 2009

(65) Prior Publication Data

US 2009/0319749 A1    Dec. 24, 2009

Related U.S. Application Data

(63) Continuation of application No. PCT/JP2007/058633, filed on Apr. 20, 2007.

(51) Int. Cl.
G06F 12/02    (2006.01)

(52) U.S. Cl.
USPC .................................. 711/170; 711/E12.002

(58) Field of Classification Search
None
See application file for complete search history.

(56) References Cited

U.S. PATENT DOCUMENTS

| 5,548,724 | A   |   | 8/1996  | Akizawa et al.         |
|-----------|-----|---|---------|------------------------|
| 5,692,192 | A   | * | 11/1997 | Sudo ............... 718/105 |
| 6,233,607 | B1  | * | 5/2001  | Taylor et al. ........ 709/217 |
| 7,194,592 | B2  |   | 3/2007  | Sato                   |
| 7,284,001 | B2  | * | 10/2007 | Sugioka ............... 1/1 |
| 2005/0267929 | A1 |   | 12/2005 | Kitamura              |

FOREIGN PATENT DOCUMENTS

| JP | A 63-56873    | 3/1988  |
| JP | 6-332782 A    | 12/1994 |
| JP | A 11-161555   | 6/1999  |
| JP | A 2001-51963  | 2/2001  |
| JP | 2003-296167 A | 10/2003 |

(Continued)

OTHER PUBLICATIONS

Japanese Office Action mailed Dec. 6, 2011 for corresponding Japanese Application No. 2009-512810, with Partial English-Translation.

(Continued)

Primary Examiner — Reginald Bragdon
Assistant Examiner — Eric Loonan
(74) Attorney, Agent, or Firm — Fujitsu Patent Center

(57) ABSTRACT

In a computer for executing processing based on a storage management program, a management information storing unit designates, from the data blocks having the same content, main-data used as an access destination and sub-data used as a backup, and stores management information that registers storage nodes as allocation destinations of the respective main-data and sub-data; a load information collecting unit continuously collects load information on the storage nodes; a replacement object detecting unit detects a pair of the main-data and the sub-data having the same content and having a predetermined condition such that a load difference between the allocation destination of the main-data and that of the sub-data exceeds a predetermined allowable value; and a management information updating unit replaces roles of the main-data and the sub-data between the detected pair of data blocks.

18 Claims, 15 Drawing Sheets

(56) References Cited

FOREIGN PATENT DOCUMENTS

| JP | 2004-199264 A | 7/2004 |
| JP | A 2005-276017 | 10/2005 |
| JP | 2006-12005 A | 1/2006 |
| JP | 2006-185413 A | 7/2006 |
| JP | A 2006-228188 | 8/2006 |

OTHER PUBLICATIONS

Japanese Office Action mailed Apr. 24, 2012 for corresponding to Japanese Application No. 2009-512810, with Partial English-language Translation.

\* cited by examiner

| SLICE INFORMATION TABLE ||||||| 131 |
|---|---|---|---|---|---|---|
| DISK | PHYSICAL ADDRESS | THE NUMBER OF BLOCKS | VOLUME | LOGICAL ADDRESS | TYPE | SECONDARY |
| sd-a | 0 | 1024 | VV-1 | 0 | P | SN-C, sd-a, 1024 |
| | 2048 | 512 | VV-1 | 4608 | P | SN-D, sd-b, 0 |
| | 3072 | 512 | VV-1 | 4096 | S | - |
| | 5120 | 1024 | VV-1 | 5120 | P | SN-B, sd-b, 4096 |

| LOGICAL VOLUME TABLE (VV-1) |||||||
|---|---|---|---|---|---|---|
| SEGMENT | LOGICAL ADDRESS | THE NUMBER OF BLOCKS | TYPE | NODE | DISK | PHYSICAL ADDRESS |
| 1 | 0 | 1024 | P | SN-A | sd-a | 0 |
| | | | S | SN-C | sd-a | 1024 |
| 2 | 1024 | 2048 | P | SN-D | sd-b | 5120 |
| | | | S | SN-C | sd-a | 5120 |
| 3 | 3072 | 1024 | P | SN-C | sd-a | 2048 |
| | | | S | SN-B | sd-b | 2048 |
| 4 | 4096 | 512 | P | SN-B | sd-b | 3072 |
| | | | S | SN-A | sd-a | 3072 |
| 5 | 4608 | 512 | P | SN-A | sd-a | 2048 |
| | | | S | SN-D | sd-b | 0 |
| 6 | 5120 | 1024 | P | SN-A | sd-a | 5120 |
| | | | S | SN-B | sd-b | 4096 |

FIG. 9

| LOAD INFORMATION TABLE | | | | |
|---|---|---|---|---|
| NODE | CPU LOAD | THE NUMBER OF I/OS | THE NUMBER OF I/OS OVER A PERIOD OF TIME | I/F USAGE RATE |
| SN-A | 75% | 10000 | 1000 | 66% |
| SN-B | 50% | 5600 | 897 | 35% |
| SN-C | 45% | 6500 | 1210 | 10% |
| SN-D | 30% | 7880 | 3084 | 40% |

PROGRAM, APPARATUS AND METHOD FOR MANAGING DATA ALLOCATION OF DISTRIBUTED STORAGE SYSTEM INCLUDING STORAGE NODES

This application is a continuing application, filed under 35 U.S.C. §111(a), of International Application PCT/JP2007/058633, filed Apr. 20, 2007.

FIELD

The embodiments discussed herein are related to a storage management program, apparatus, and method for managing a data allocation status of a storage system.

BACKGROUND

A demand for higher performance of storage systems used to store data is now increasing more and more along with the popularization of information processing using a computer. For example, a demand for higher speed of processing for reading and writing a large amount of data, that is, a demand for high performance is increasing. Further, a demand for preventing disappearance of accumulated data even when a failure occurs in a part of hardware constituting a storage system, that is, a demand for high reliability is increasing.

As a storage system which meets such various demands for high performance and high reliability, a distributed storage system is known. In the distributed storage system, a plurality of data blocks are distributed and allocated to a plurality of storage nodes connected via a network. Also, the data blocks having the same content are often allocated redundantly to a plurality of storage nodes. That is, load distribution and data redundancy are performed using a plurality of storage nodes. This makes it possible to improve the response performance and reliability of the storage system.

During an operation of the distributed storage system, a data allocation status constantly changes with the addition or deletion of data. Here, when data that frequently receives access requests is collectively allocated to a specific storage node, load distribution becomes insufficient and as a result, the response performance is deteriorated. Accordingly, for maintaining high response performance of the distributed storage system, the data allocation needs to be managed in consideration of a load of individual storage node during the operation.

Specifically, the following methods are known as a management method for maintaining high response performance of the distributed storage system. A first method is a method for dynamically determining a storage node as an access destination when receiving an access request. Specifically, when the data that receives an access request is allocated redundantly to a plurality of storage nodes, the distributed storage system determines as an access destination a storage node having the minimum load at the access request (e.g., Japanese Laid-open Patent publication Nos. 63-56873 and 11-161555). A second method is a method for automatically moving data itself such that the amount of access requests is equal as much as possible between the storage nodes (e.g., Japanese Laid-open Patent publication No. 2005-276017). These methods make it possible to prevent loads from concentrating on a specific storage node.

However, technologies described in Japanese Laid-open Patent publication Nos. 63-56873, 11-161555, and 2005-276017 have the following problems. In the dynamic load distribution technologies described in Japanese Laid-open Patent publication Nos. 63-56873 and 11-161555, processing for always determining an access destination at each access request is performed between an access request source and a storage node. Therefore, a mechanism for realizing data allocation management becomes complicated, and at the same time, a response delays by the processing for determining the access destination. In the data automatic movement technology disclosed in Japanese Laid-open Patent publication No. 2005-276017, data movement itself applies a load to the storage node. Therefore, a response delays during the data movement. When data is repeatedly moved, a burden on a hardware such as a disk device increases, and as a result, failures are caused.

SUMMARY

According to an aspect of the embodiments, there is provided a computer-readable recording medium which records a storage management program for managing a data allocation status of a distributed storage system that distributes and allocates a plurality of data blocks having the same content to a plurality of storage nodes connected via a network, the program causing a computer to function as: a management information storing unit which designates, from the data blocks having the same content, main-data used as an access destination at an access request and sub-data used as a backup, and stores management information that registers the storage nodes as allocation destinations of the respective main-data and sub-data; a load information collecting unit which continuously collects load information on the storage nodes; a replacement object detecting unit which detects as a replacement object a pair of the main-data and the sub-data having the same content based on the management information stored in the management information storing unit and the load information collected by the load information collecting unit, the pair of the main-data and the sub-data having a condition such that a load difference between the main-data allocation destination and the sub-data allocation destination exceeds a predetermined allowable value; and a management information updating unit which updates the management information stored in the management information storing unit so as to replace roles of the main-data and the sub-data between the pair of data blocks detected by the replacement object detecting unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 1 outlines the present embodiment;

FIG. 8 illustrates a data structure example of a slice information table;

FIG. 9 illustrates a data structure example of a logical volume table;

FIG. 10 illustrates a data structure example of a load information table;

DESCRIPTION OF EMBODIMENT(S)

Figure 1:
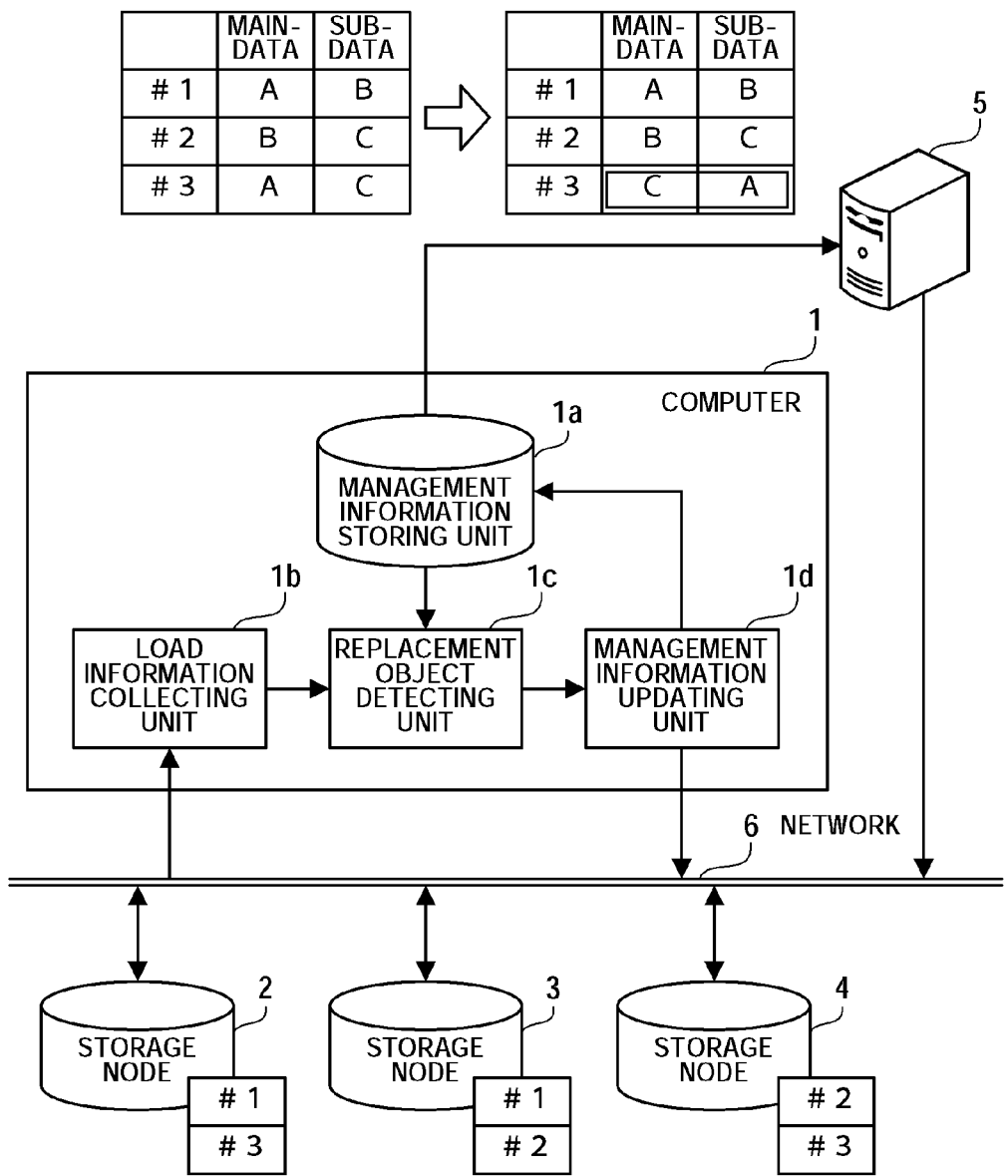

Embodiments of the present invention will be explained below with reference to the accompanying drawings, wherein like reference numerals refer to like elements throughout. First, an outline of the present embodiment will be described, and then, specific contents of the present embodiment will be described.

FIG. 1 outlines a distributed storage system according to the present embodiment. The distributed storage system illustrated in FIG. 1 includes a computer 1, storage nodes 2, 3, and 4, a computer 5, and a network 6. The computer 1, the storage nodes 2, 3, and 4, and the computer 5 are connected to a network 6.

The computer 1 manages a status of data allocation to the storage nodes 2, 3, and 4. The computer 1 has a management information storing unit 1a, a load information collecting unit 1b, a replacement object detecting unit 1c, and a management information updating unit 1d.

The management information storing unit 1a stores management information. The management information is information for managing a status of data allocation. Specifically, the management information registers storage nodes as allocation destinations of the respective data blocks. When a plurality of data blocks having the same content are distributed and allocated to the storage nodes 2, 3, and 4, main-data used as an access destination when an access request is generated for the data and sub-data used as a backup are designated.

The load information collecting unit 1b collects load information of the storage nodes 2, 3, and 4. Examples of the load information include a load of a CPU (Central Processing Unit), the number of received access requests, and a network usage rate. The load information collecting unit 1b continuously collects latest load information.

The replacement object detecting unit 1c detects a pair of the main-data and sub-data having the same content and having a predetermined condition based on the management information stored in the management information storing unit 1a and the load information collected by the load information collecting unit 1b. The predetermined condition means that a load difference between a storage node as an allocation destination of the main-data and that of the sub-data exceeds a predetermined allowable value. The replacement object detecting unit 1c continuously performs processing for examining whether a pair of the main-data and the sub-data having the above-described condition is present.

The management information updating unit 1d updates, when the replacement object detecting unit 1c detects a pair of the main-data and the sub-data having the above-described condition, the management information stored in the management information storing unit 1a. Specifically, the management information updating unit 1d replaces roles of the main-data and the sub-data between one detected pair of the data blocks. That is, data used as a backup before the replacement acts as data used as an access destination, and meanwhile, data used as an access destination before the replacement acts as data used as a backup.

The computer 5 acquires management information from the computer 1, and accesses the data allocated to the storage nodes 2, 3, and 4 based on the management information. For example, when the main-data of data to be used is allocated to the storage node 2 and the sub-data thereof is allocated to the storage node 3, the computer 5 accesses the storage node 2. When the main-data is updated by the access, communication is performed between the storage nodes, and an updated content is automatically reflected to the sub-data. Note, however, that the computer 5 may simultaneously update the main-data and the sub-data.

Here, suppose that the main-data of the data #1 is allocated to the storage node 2 (denoted as "A" in the management information) and the sub-data of the data #1 is allocated to the storage node 3 (denoted as "B" in the management information), the main-data of the data #2 is allocated to the storage node 3 and the sub-data of the data #2 is allocated to the storage node 4 (denoted as "C" in the management information), and the main-data of the data #3 is allocated to the storage node 2 and the sub-data of the data #3 is allocated to the storage node 4. Further, suppose that among the storage nodes 2, 3, and 4, the storage node 2 has the highest load, the storage node 4 has the lowest load and a load difference between the storage node 2 and the storage node 4 exceeds a predetermined allowable value.

At this time, the computer 1 updates the management information, and replaces roles of the main-data and sub-data of the data #3. That is, after the replacement, the main-data of the data #3 is allocated to the storage node 4, and the sub-data of the data #3 is allocated to the storage node 2. Therefore, when using the data #3, the computer 5 accesses the storage node 4.

Thus, according to the computer 1 for executing a storage management program, the load information collecting unit 1b continuously collects the load information of the storage nodes 2, 3, and 4. The replacement object detecting unit 1c detects a pair of the main-data and sub-data having the same content and having a condition such that a load difference between the allocation destination of the main-data and that of the sub-data exceeds a predetermined allowable value. The management information updating unit 1d replaces roles of the main-data and the sub-data between the detected pair of data blocks. That is, data used as a backup before the replacement acts as data used as an access destination, and meanwhile, data used as an access destination before the replacement acts as data used as a backup.

As a result, without moving data, a storage node as an access destination of the data is changed. At this time, an access destination is not necessarily determined in units of access requests. Accordingly, this prevents a response from delaying due to load distribution processing itself, so that a response performance of the distributed storage system can be surely improved.

The present embodiment will be described in detail below with reference to the accompanying drawings.

Figure 2:
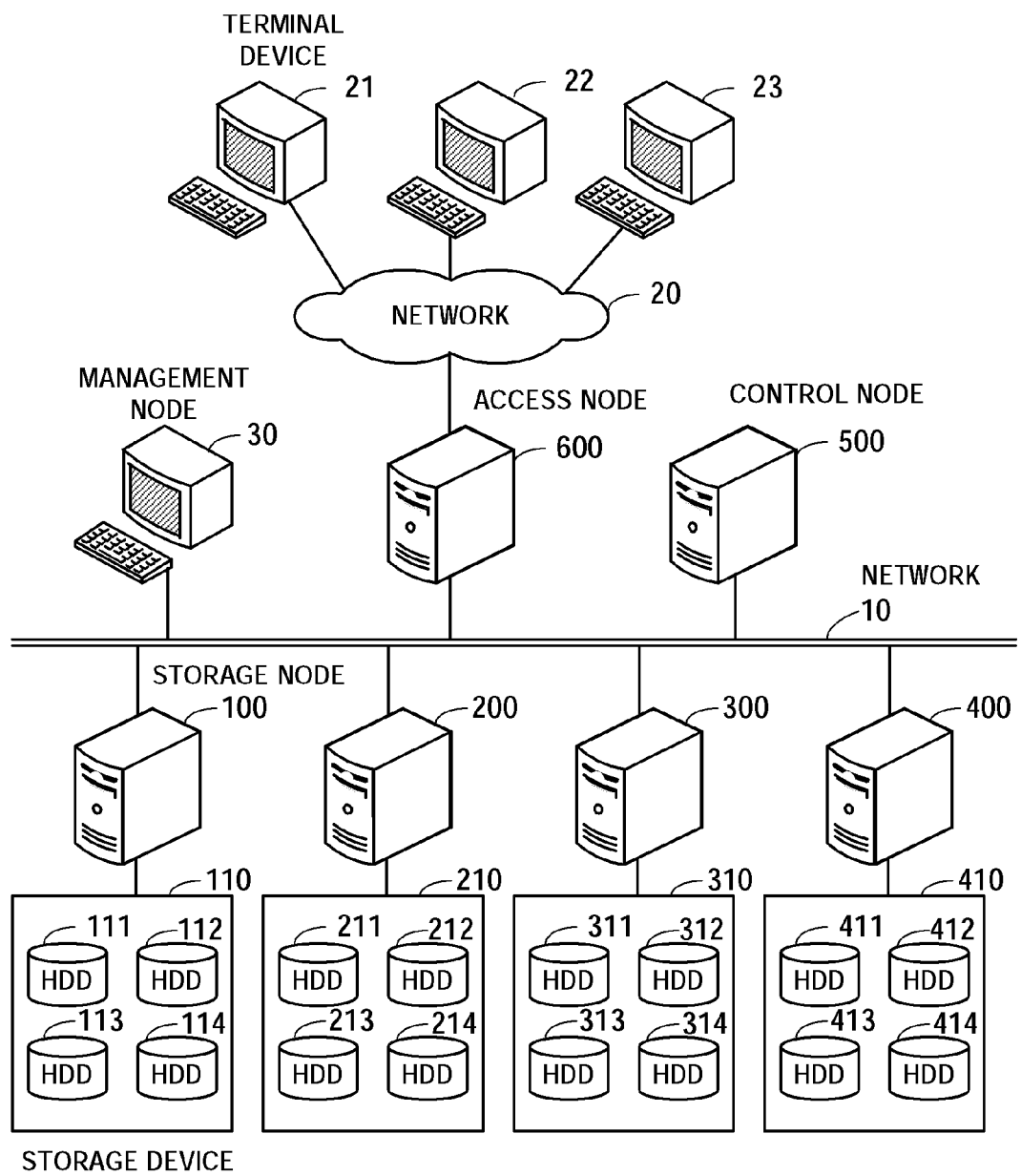
FIG. 2 illustrates a system configuration according to the present embodiment.

FIG. 2 illustrates a system configuration according to the present embodiment. A distributed storage system illustrated in FIG. 2 improves reliability and processing performance by distributing and allocating a plurality of data blocks having the same content to a plurality of storage nodes connected via a network.

In the distributed storage system according to the present embodiment, storage nodes 100, 200, 300, and 400, a control node 500, an access node 600, and a management node 30 are interconnected via a network 10. Terminal devices 21, 22, and 23 are connected to the access node 600 via a network 20.

Storage devices 110, 210, 310, and 410 are connected to the storage nodes 100, 200, 300, and 400, respectively. The storage nodes 100, 200, 300, and 400 manage data stored in the connected storage devices 110, 210, 310, and 410, respectively, and provide the managing data to the access node 600 via the network 10, respectively. The storage nodes 100, 200, 300, and 400 manage data by applying redundancy to the data. That is, data blocks having the same content are managed by at least two storage nodes.

Hard disk drives (HDDs) 111, 112, 113, and 114 are mounted in the storage device 110. Hard disk drives (HDDs) 211, 212, 213, and 214 are mounted in the storage device 210. Hard disk drives (HDDs) 311, 312, 313, and 314 are mounted in the storage device 310. Hard disk drives (HDDs) 411, 412, 413, and 414 are mounted in the storage device 410. The storage devices 110, 210, 310, and 410 are RAID (Redundant Array of Independent Disks) systems using a plurality of built-in HDDs. In the present embodiment, the storage devices 110, 210, 310, and 410 provide a disk management service of RAID 5.

The control node 500 manages the storage nodes 100, 200, 300, and 400. Specifically, the control node 500 retains a logical volume indicating statuses of data allocation. The control node 500 acquires information on data management from the storage nodes 100, 200, 300, and 400, and updates the logical volume as required. Further, the control node 500 notifies, when updating the logical volume, the updated content to those storage nodes influenced by the update. The logical volume will be described in detail later.

The access node 600 provides the terminal devices 21, 22, and 23 with information processing services using data managed by the storage nodes 100, 200, 300, and 400. Specifically, the access node 600 executes a predetermined program in response to requests from the terminal devices 21, 22, and 23, and accesses the storage nodes 100, 200, 300, and 400, if desired. Here, the access node 600 acquires a logical volume from the control node 500, and identifies a storage node to be accessed based on the acquired logical volume.

The management node 30 is a terminal device operated by an administrator of the distributed storage system. The administrator of the distributed storage system can perform various settings required for operation by operating the management node 30 and accessing the storage nodes 100, 200, 300, and 400, the control node 500, and the access node 600.

Next, a hardware configuration of the storage nodes 100, 200, 300, and 400, the control node 500, the access node 600, the management node 30, and the terminal devices 21, 22, and 23 will be described.

Figure 3:
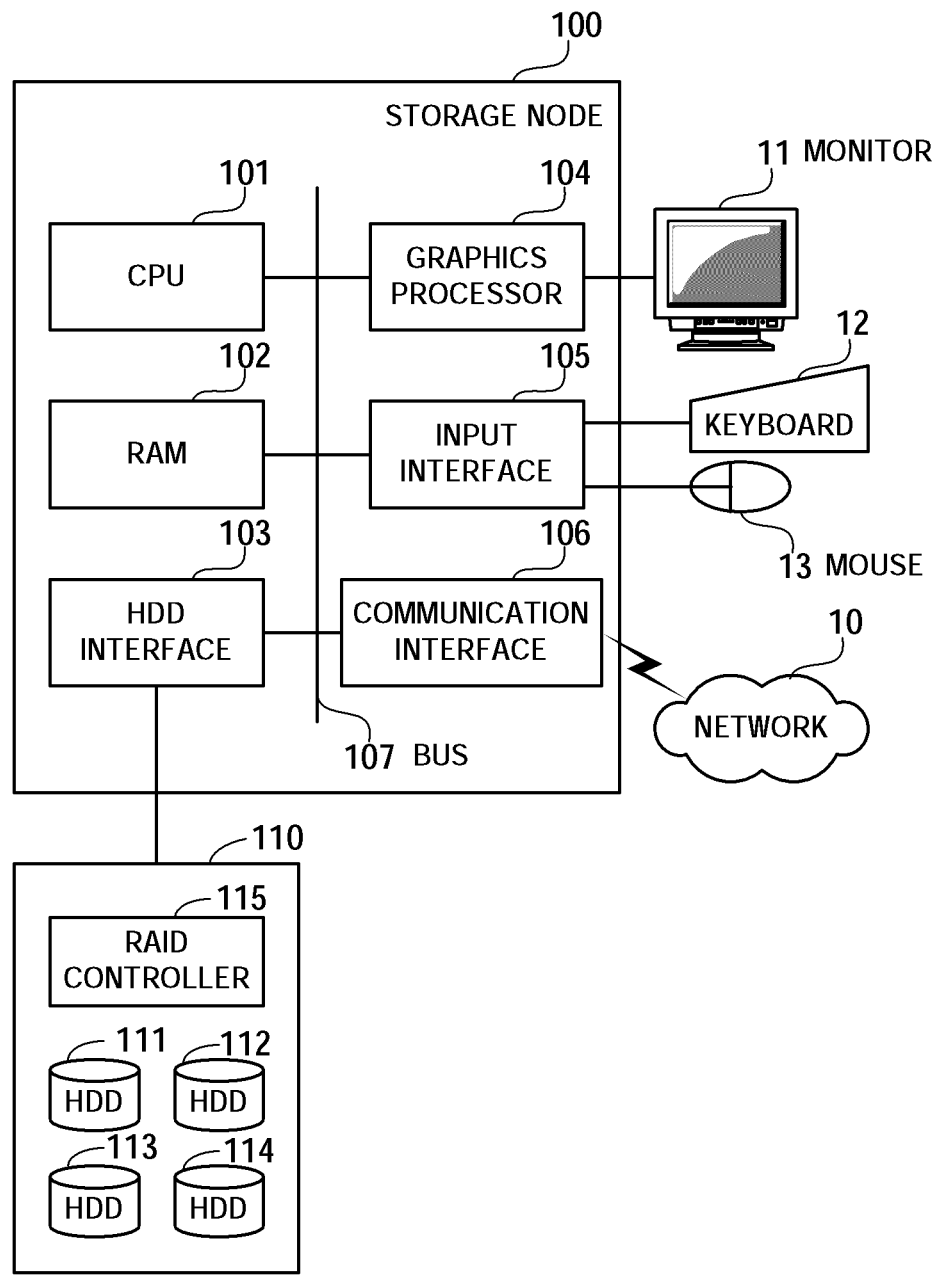
FIG. 3 illustrates a hardware configuration of a storage node.

FIG. 3 illustrates a hardware configuration of the storage node 100. The entire storage node 100 is controlled by a CPU 101. The CPU 101 is connected to a RAM (Random Access Memory) 102, an HDD interface 103, a graphics processor 104, an input interface 105, and a communication interface 106 via a bus 107.

The RAM 102 temporarily stores at least a part of OS (operating system) programs and application programs executed by the CPU 101. The RAM 102 also stores various data required for processing by the CPU 101.

The HDD interface 103 is connected to the storage device 110. The HDD interface 103 communicates with a built-in RAID controller 115 within the storage device 110, and inputs and outputs data to and from the storage device 110. The RAID controller 115 within the storage device 110 has functions of RAIDs 0 to 5, and manages HDDs 111 to 114 as one hard disk drive.

The graphics processor 104 is connected to a monitor 11. The graphics processor 104 displays images on the screen of the monitor 11 according to a command from the CPU 101. The input interface 105 is connected to a keyboard 12 and a mouse 13. The input interface 105 transmits signals received from the keyboard 12 or the mouse 13 to the CPU 101 via the bus 107.

The communication interface 106 is connected to the network 10. The communication interface 106 exchanges data with other computers via the network 10.

The storage nodes 200, 300, and 400 can be realized by the same hardware configuration as that of the storage node 100.

Figure 4:
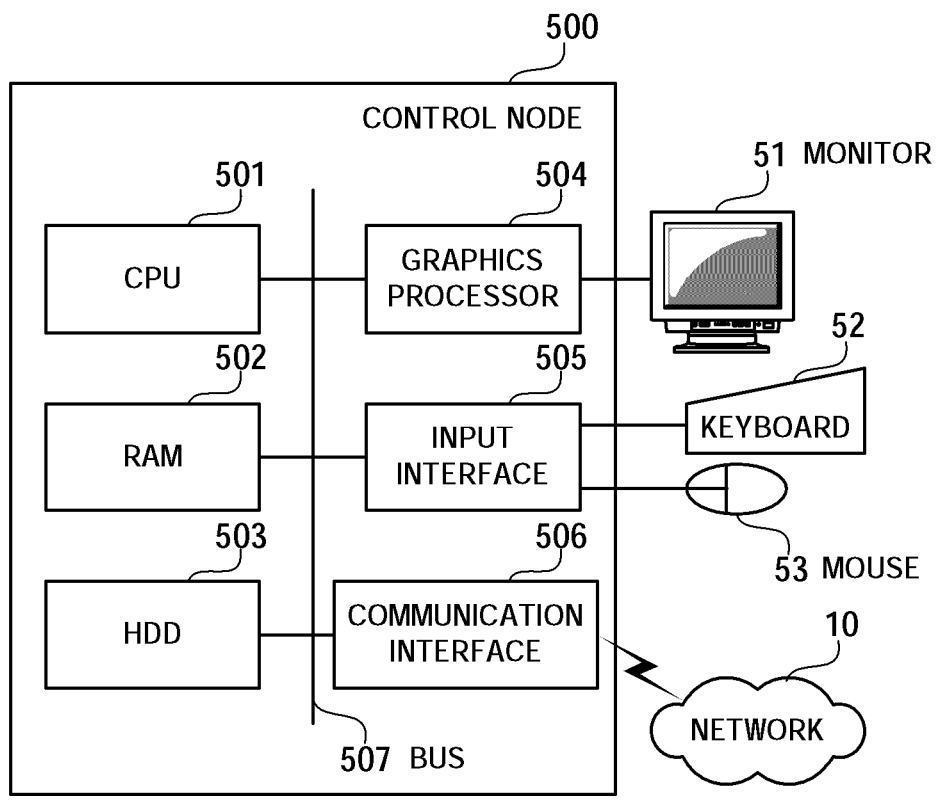
FIG. 4 illustrates a hardware configuration of a control node.

FIG. 4 illustrates a hardware configuration of the control node 500. The entire control node 500 is controlled by a CPU 501. The CPU 501 is connected to a RAM 502, an HDD 503, a graphics processor 504, an input interface 505, and a communication interface 506 via a bus 507.

The RAM 502 temporarily stores at least a part of OS programs and application programs executed by the CPU 501. The RAM 502 also stores various data required for processing by the CPU 501. The HDD 503 stores an OS program and application programs.

The graphics processor 504 is connected to a monitor 51. The graphics processor 504 displays images on the screen of the monitor 51 according to a command from the CPU 501. The input interface 505 is connected to a keyboard 52 and a mouse 53. The input interface 505 transmits signals received from the keyboard 52 or the mouse 53 to the CPU 501 via the bus 507. The communication interface 506 is connected to the network 10. The communication interface 506 exchanges data with other computers via the network 10.

The access node 600, the management node 30, and the terminal devices 21, 22, and 23 can be realized by the same hardware configuration as that of the control node 500. Note, however, that the access node 600 further has a communication interface to connect to the network 20 in addition to a communication interface to connect to the network 10.

The processing functions of the present embodiment can be realized by the above-described hardware configuration.

Here, a logical volume provided by the control node 500 to the access node 600 will be described. The logical volume is a virtual volume that may allow the access node 600 to easily use data distributed and managed by the storage nodes 100, 200, 300 and 400.

Figure 5:
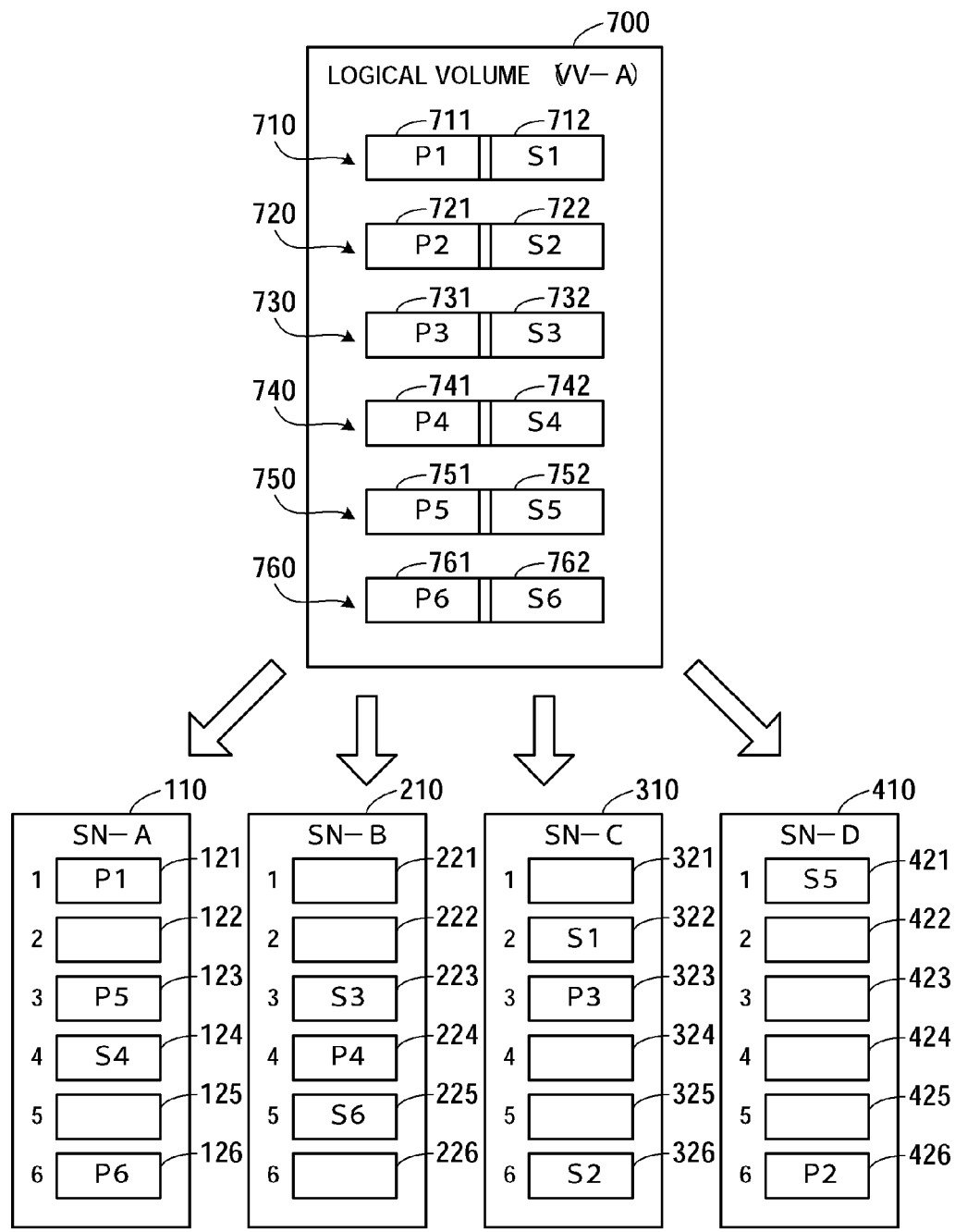
FIG. 5 is a first schematic diagram illustrating a data structure of a logical volume.

FIG. 5 is a first schematic diagram illustrating a data structure of a logical volume 700. A logical volume ID called "VV-A" is assigned to the logical volume 700. Node IDs called "SN-A," "SN-B," "SN-C," and "SN-D" are assigned to the storage nodes 100, 200, 300, and 400, respectively.

A logical disk of RAID 5 is configured for each of the storage devices 110, 210, 310, and 410 connected to the storage nodes 100, 200, 300, and 400. This logical disk is divided into six slices and managed collectively within each storage node.

In the example of FIG. 5, a storage area within the storage device 110 is divided into six slices 121 to 126. A storage area within the storage device 210 is divided into six slices 221 to 226. A storage area within the storage device 310 is divided into six slices 321 to 326. A storage area within the storage device 410 is divided into six slices 421 to 426.

The logical volume 700 includes units of segments 710, 720, 730, 740, 750, and 760. The segment 710 includes a pair of a primary slice 711 and a secondary slice 712, the segment 720 includes a pair of a primary slice 721 and a secondary slice 722, the segment 730 includes a pair of a primary slice 731 and a secondary slice 732, the segment 740 includes a pair of a primary slice 741 and a secondary slice 742, the segment 750 includes a pair of a primary slice 751 and a secondary slice 752, and the segment 760 includes a pair of a primary slice 761 and a secondary slice 762. The slices belonging to the same segment are allocated to belong to different storage nodes.

In the example of FIG. 5, a slice ID is indicated by a combination of alphabet "P" or "S" and a numeric character. The "P" indicates that the slice is a primary slice, while the "S" indicates that the slice is a secondary slice. The numeric character subsequent to the alphabet indicates the order of segments. For example, the primary slice 711 of the first segment 710 is indicated by "P1" and the secondary slice 712 thereof is indicated by "S1".

Each of the primary and secondary slices of the logical volume 700 having the above structure is associated with any one of slices in the storage devices 110, 210, 310, and 410. For example, the primary slice 711 of the segment 710 is associated with a slice 121 in the storage device 110, and the secondary slice 712 of the segment 710 is associated with a slice 322 in the storage device 310.

The storage devices 110, 210, 310, and 410 store data of a primary slice or a secondary slice associated with a slice in each of the storage devices.

Next, a configuration of modules of the storage nodes 100, 200, 300, and 400, the control node 500, and the access node 600 will be described.

Figure 6:
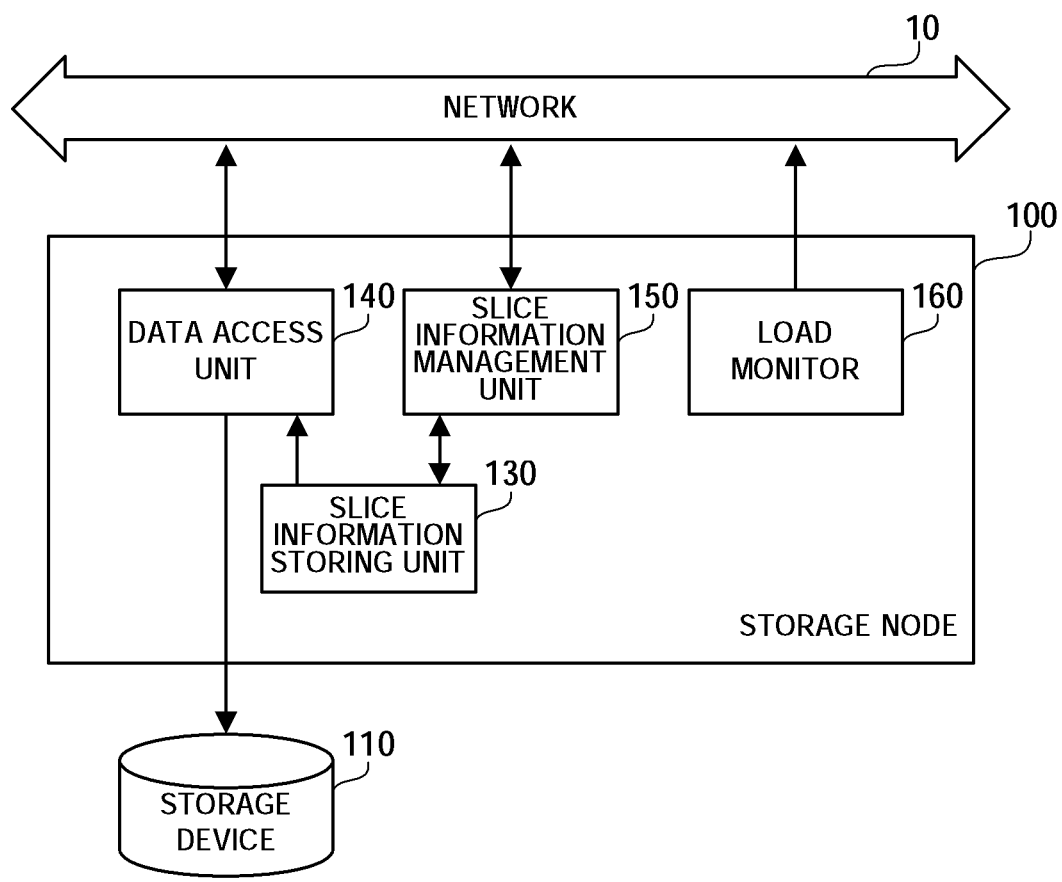
FIG. 6 is a block diagram illustrating a function of a storage node.

FIG. 6 is a block diagram illustrating functions of the storage node 100. The storage node 100 has a slice information storing unit 130, a data access unit 140, a slice information management unit 150, and a load monitor 160.

The slice information storing unit 130 stores information on slices stored in the storage device 110. The slice information contains information such as an address for identifying a slice or a type of assignment to a slice (any one of primary and secondary slices). The slice information further contains information on a storage node that manages a secondary slice corresponding to a primary slice.

The data access unit 140 manipulates, when receiving an access from the access node 600, data stored in the storage device 110 with reference to the slice information stored in the slice information storing unit 130.

Specifically, when receiving a data read request with a designated address from the access node 600, the data access unit 140 determines whether a slice with the designated address is a primary slice. If the slice is a primary slice, the data access unit 140 acquires data corresponding to the designated address from the storage node 110, and transmits the acquired data to the access node 600. If the slice is not a primary slice, the data access unit 140 notifies the access node 600 that the address designation is inappropriate.

When receiving a data write request with a designated address and content to be written from the access node 600, the data access unit 140 tries to write the data to a position corresponding to the designated address in the storage device 110. The data access unit 140 notifies the access node 600 of a result of the writing. Here, when the slice with the designated address is a primary slice, the data access unit 140 instructs the storage node that manages the corresponding secondary slice to write the same content to the secondary slice. Thus, the content of the primary slice and that of the secondary slice are maintained to be identical.

The slice information management unit 150 periodically notifies the control node 500 of an operation status of the storage node 100. When receiving an acquisition request of slice information from the control node 500, the slice information management unit 150 transmits the slice information stored in the slice information storing unit 130 to the control node 500. When receiving an instruction to update slice information, the slice information management unit 150 reflects the instructed update content to the slice information stored in the slice information storing unit 130.

When the storage device 110 starts rearrangement of a data storage position to make an access to HDD more efficient, the slice information management unit 150 notifies the control node 500 of the rearrangement start information. After completion of the rearrangement, the slice information management unit 150 reflects an address of each slice after the rearrangement to the slice information stored in the slice information storing unit 130. Simultaneously, the slice information management unit 150 transmits the updated slice information to the control node 500.

The load monitor 160 continuously monitors a load of the storage node 100. For example, the load monitor 160 monitors an operation rate of the CPU 101, the number of I/O (Input/Output) requests to the HDD interface 103, and a usage rate of the communication interface 106. Then, the load monitor 160 periodically transmits load information indicating a load of the storage node 100 to the control node 500. Notification of the operation status by the slice information management unit 150 and transmission of the load information by the load monitor 160 may be simultaneously performed to the control node 500.

The storage nodes 200, 300, and 400 can be realized by the same module configuration as that of the storage node 100.

Figure 7:
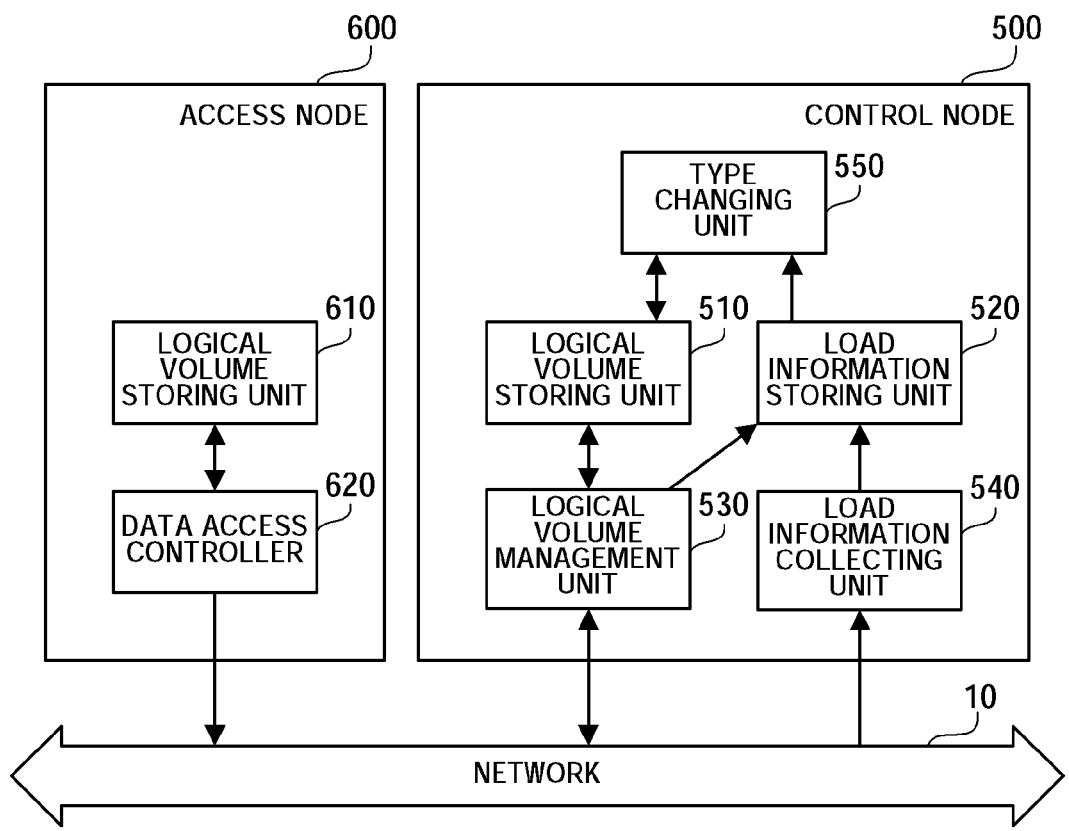
FIG. 7 is a block diagram illustrating functions of a control node and an access node.

FIG. 7 is a block diagram illustrating functions of the control node 500 and the access node 600.

The control node 500 has a logical volume storing unit 510, a load information storing unit 520, a logical volume management unit 530, a load information collecting unit 540, and a type changing unit 550.

The logical volume storing unit 510 stores one or more logical volumes. The logical volume manages each segment by logical addresses as virtual addresses in order to collectively handle storage areas managed by the storage devices 110, 210, 310, and 410. The logical volume includes a logical address for identifying a segment and information for identifying a primary slice and secondary slice that belong to the segment.

The load information storing unit 520 stores load information indicating a latest load of each of the storage nodes 100, 200, 300, and 400. The load information stored in the load information storing unit 520 is acquired from the storage nodes 100, 200, 300, and 400.

The logical volume management unit 530 receives notifications indicating operation statuses from the storage nodes 100, 200, 300, and 400 via the network 10. As a result, the logical volume management unit 530 finds whether each of the storage nodes 100, 200, 300, and 400 operates properly. The logical volume management unit 530 acquires slice information from the storage nodes 100, 200, 300, and 400, if desired, and updates the logical volume stored in the logical volume storing unit 510. The logical volume management unit 530 notifies, when updating the logical volume, the updated content to the storage node influenced by the update.

When receiving notifications indicating a start of the rearrangement of a data storage position from the storage nodes 100, 200, 300, and 400, the logical volume management unit 530 stores, in the load information storing unit 520, information indicating that the data rearrangement is in execution. This storage process is executed in consideration that when the rearrangement starts, a load of the storage device increases and a response performance to an access extremely decreases. When receiving the rearranged slice information from the storage nodes 100, 200, 300, and 400, the logical volume management unit 530 reflects the received slice information to the logical volume storing unit 510. At the same time, the logical volume management unit 530 deletes, from the load information storing unit 520, information indicating that the data rearrangement is in execution.

When receiving a logical volume reference request from the access node 600, the logical volume management unit 530 transmits a logical volume stored in the logical volume storing unit 510 to the access node 600.

The load information collecting unit 540 receives, via the network 10, load information periodically transmitted by the storage nodes 100, 200, 300, and 400. Then, the load information collecting unit 540 stores the received load information in the load information storing unit 520.

The type changing unit 550 continuously monitors a logical volume stored in the logical volume storing unit 510 and load information stored in the load information storing unit 520, and determines a segment including a primary slice and secondary slice to be replaced. Specifically, when a load difference between a storage node assigned with a primary slice and that assigned with a secondary slice exceeds a predetermined allowable value, the type changing unit 550 determines that the primary slice and the secondary slice are to be replaced. Then, the type changing unit 550 updates a logical volume stored in the logical volume storing unit 510 based on the determination results. Details of the determination method will be described later.

The logical volume management unit 530 and the load information collecting unit 540 may periodically access the storage nodes 100, 200, 300, and 400 to collect various information units instead of waiting for various information units to be transmitted from the storage nodes 100, 200, 300, and 400.

The access node 600 has a logical volume storing unit 610 and a data access controller 620.

The logical volume storing unit 610 stores the same logical volume as that stored in the logical volume storing unit 510 of the control node 500.

When receiving a data access request from a program under operation, the data access controller 620 first checks whether the logical volume is stored in the logical volume storing unit 610. When the logical volume is not stored, the data access controller 620 acquires the logical volume from the control node 500, and stores the acquired logical volume in the logical volume storing unit 610.

Then, the data access controller 620 identifies a storage node as an access destination based on the logical volume. Specifically, the data access controller 620 identifies a segment having data to be used, and identifies a storage node that manages a primary slice of the identified segment. Thereafter, the data access controller 620 accesses the identified storage node. When the data access controller 620 fails to access the identified storage node, a status of data allocation may have been changed after acquiring a logical volume from the control node 500. Therefore, the data access controller 620 acquires a latest logical volume from the control node 500, and retries to access the storage node.

FIG. 8 illustrates a data structure example of a slice information table 131. The slice information table 131 illustrated in FIG. 8 is stored in the slice information storing unit 130 of the storage node 100. The slice information table 131 provides an item indicating a disk, an item indicating a physical address, an item indicating the number of blocks, an item indicating a volume, an item indicating a logical address, an item indicating a type, and an item indicating a secondary slice. Information units of the respective items arranged in the lateral direction are associated with each other, and compose information on one slice.

In the item indicating a disk, a disk ID for identifying an HDD is set. In the item indicating a physical address, a physical address indicating a first block of a slice is set. In the item indicating the number of blocks, the number of blocks included in a slice is set.

In the item indicating a volume, a logical volume ID of a logical volume having a segment associated with a slice is set. In the item indicating a logical address, a logical address indicating a first block of a segment associated with a slice is set. In the item indicating a type, either one of the values "P" or "S" is set. The "P" indicates a primary slice, while the "S" indicates a secondary slice.

In the item indicating a secondary slice, when the type of a slice is a primary slice, information on an assignment destination of the corresponding secondary slice is set. Specifically, a node ID of a storage node, a disk ID of an HDD, and a physical address indicating a first block of a slice are set. When the type of a slice is a secondary slice, the item indicating the secondary slice is blank.

Slice information stored in the slice information table 131 is appropriately updated by the slice information management unit 150. For example, the following information is stored: a disk ID is "sd-a", a physical address is "3072", the number of blocks is "512", a volume ID is "VV-1", a logical address is "4096", and a type is "S". This indicates that a storage area from block 3072 to block 3583 of a disk with a disk ID "sd-a" constitutes one slice to which a segment corresponding to the logical address ranging from block 4096 to block 4607 is assigned as a secondary slice.

FIG. 9 illustrates a data structure example of a logical volume table 511. The logical volume table 511 illustrated in FIG. 9 is a table describing a logical volume with a logical volume ID "VV-1". The logical volume table 511 is stored in the logical volume storing unit 510 of the control node 500. The logical volume table 511 provides an item indicating a segment, an item indicating a logical address, an item indicating the number of blocks, an item indicating a type, an item indicating a node, an item indicating a disk, and an item indicating a physical address. Information units of the respective items arranged in the lateral direction are associated with each other.

In the item indicating a segment, a segment ID for identifying a segment is set. In the item indicating a logical address, a logical address indicating a first block of a segment is set. In the item indicating the number of blocks, the number of blocks included in a segment is set.

In the item indicating a type, either one of the values "P" or "S" is set. In the item indicating a node, a node ID for identifying a storage node as an assignment destination is set. In the item indicating a disk, a disk ID for identifying an HDD within a storage node is set. In the item indicating a physical address, a physical address indicating a first block of a slice as an assignment destination is set.

Information to be stored in the logical volume table 511 is created by the logical volume management unit 530 based on the slice information acquired from the storage nodes 100, 200, 300, and 400.

FIG. 10 illustrates a data structure example of a load information table 521. The load information table 521 illustrated in FIG. 10 is stored in the load information storing unit 520 of the control node 500. The load information table 521 provides an item indicating a node, an item indicating a CPU load, an item indicating the number of I/Os, an item indicating the number of I/Os over a period of time, and an item indicating an I/F usage rate. Information units of the respective items arranged in the lateral direction are associated with each other, and compose load information on one storage node.

In the item indicating a node, a node ID for identifying a storage node is set. In the item indicating a CPU load, the present operation rate of a CPU is set. In the item indicating the number of I/Os, the total number of I/Os generated in the past is set. In the item indicating the number of I/Os over a period of time, the number of I/Os generated in the predetermined period is set. For example, the number of I/Os generated in the previous 24 hours is set. In the item indicating an I/F usage rate, a current usage rate of a network is set.

Load information stored in the load information table 521 is appropriately updated by the load information collecting unit 540. For example, the following information is stored: a node is "SN-A", a CPU load is "75%", the number of I/Os is "10000", the number of I/Os over a period of time is "1000", and an I/F usage rate is "66%".

Next, details of processing performed in the system having the above-described configuration and data structure will be described. First, processing will be described in which the type changing unit 550 of the control node 500 replaces a primary slice and a secondary slice based on a load of a storage node.

Figure 11:
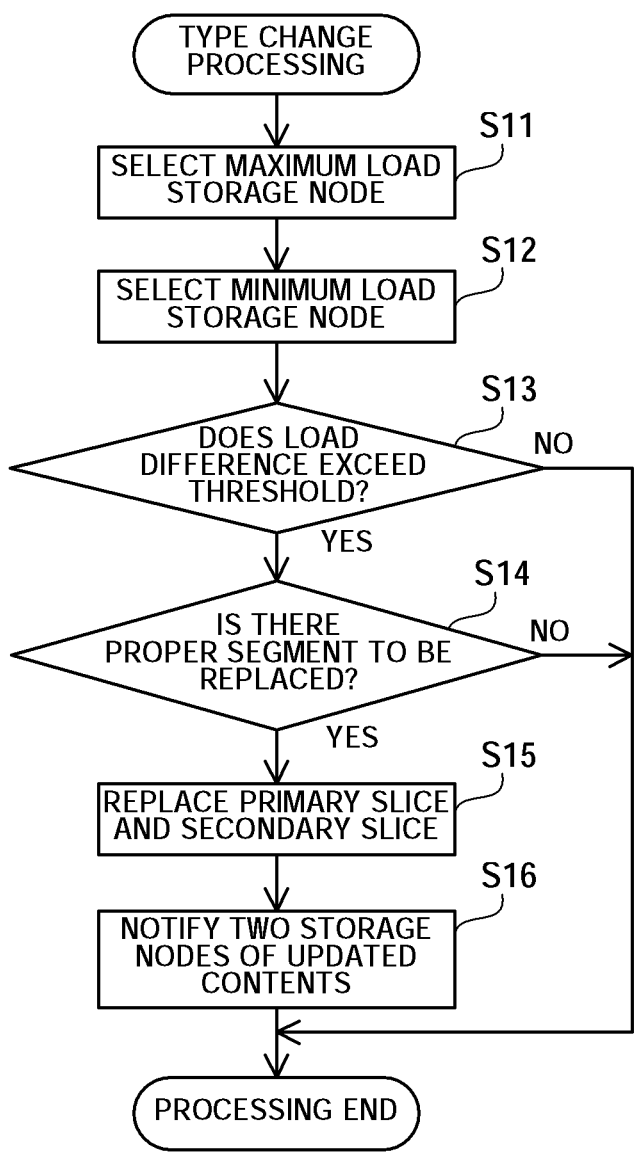
FIG. 11 is a flowchart illustrating a procedure of first type change processing.

FIG. 11 is a flowchart illustrating a procedure of a first type change processing. This type change processing is periodically performed by the type changing unit 550. Processing illustrated in FIG. 11 will be described below along the step numbers.

[Step S11] The type changing unit 550 identifies a storage node with the maximum load with reference to the load information table 521 stored in the load information storing unit 520.

[Step S12] The type changing unit 550 identifies a storage node with the minimum load with reference to the load information table 521.

[Step S13] The type changing unit 550 determines whether a load difference between the maximum load storage node identified in step S11 and the minimum load storage node identified in step S12 exceeds a predetermined threshold. If YES, the process goes to step S14. If NO, the process is ended.

[Step S14] With reference to the logical volume table 511 stored in the logical volume storing unit 510, the type changing unit 550 determines whether a segment is present such that its primary slice is assigned to the maximum load storage node identified in step S11 and its secondary slice is assigned to the minimum load storage node identified in step S12. If YES, the process goes to step S15. If NO, the process is ended.

[Step S15] The type changing unit 550 updates the logical volume table 511, and replaces a slice type between the primary slice and secondary slice having a determination condition of step S14.

[Step S16] The logical volume management unit 530 detects that the logical volume table 511 is updated, and notifies an updated content to two storage nodes that manage the respective primary slice and secondary slice replaced in step S15.

Here, an administrator of the distributed storage system previously sets in the type changing unit 550 as to which index of a CPU load, the number of I/Os, the number of I/Os over a period of time, and an I/F usage rate is used for comparing the loads. The administrator may make the settings so as to perform the comparison using any one of the indexes. Alternatively, the administrator may make the settings so as to perform the comparison using a value calculated by a predetermined formula using two or more indexes.

In the method illustrated in FIG. 11, a primary slice is selected from the maximum load storage node, and a secondary slice is selected from the minimum load storage node. Further, a secondary slice may be selected from storage nodes other than the minimum load storage node. Specifically, it is considered that a primary slice is selected from the maximum load storage node, and a secondary slice is selected from all the storage nodes whose load difference from the maximum load storage node exceeds an allowable value. At this time, when several candidates for a secondary slice are present, a secondary slice may be selected from storage nodes whose load difference from the maximum load storage node is large as much as possible.

Thus, the type changing unit 550 replaces slice types of a primary slice and a secondary slice in the following case. That is, a load difference between the maximum load storage node and the minimum load storage node exceeds an allowable value. At the same time, a segment is present such that its primary slice is assigned to the maximum load storage node and its secondary slice is assigned to the minimum load storage node. As a result, at least a part of access to the maximum load storage node is directed to the minimum load storage node. At this time, since the primary slice and the secondary slice have the same content, only processing of updating a logical volume is required, and processing of moving data itself stored in the storage devices 110, 210, 310, and 410 is not required.

For the method of detecting a primary slice and a secondary slice to be replaced, various methods other than the above-described method are considered. Next, another example of a detection method will be described.

Figure 12:
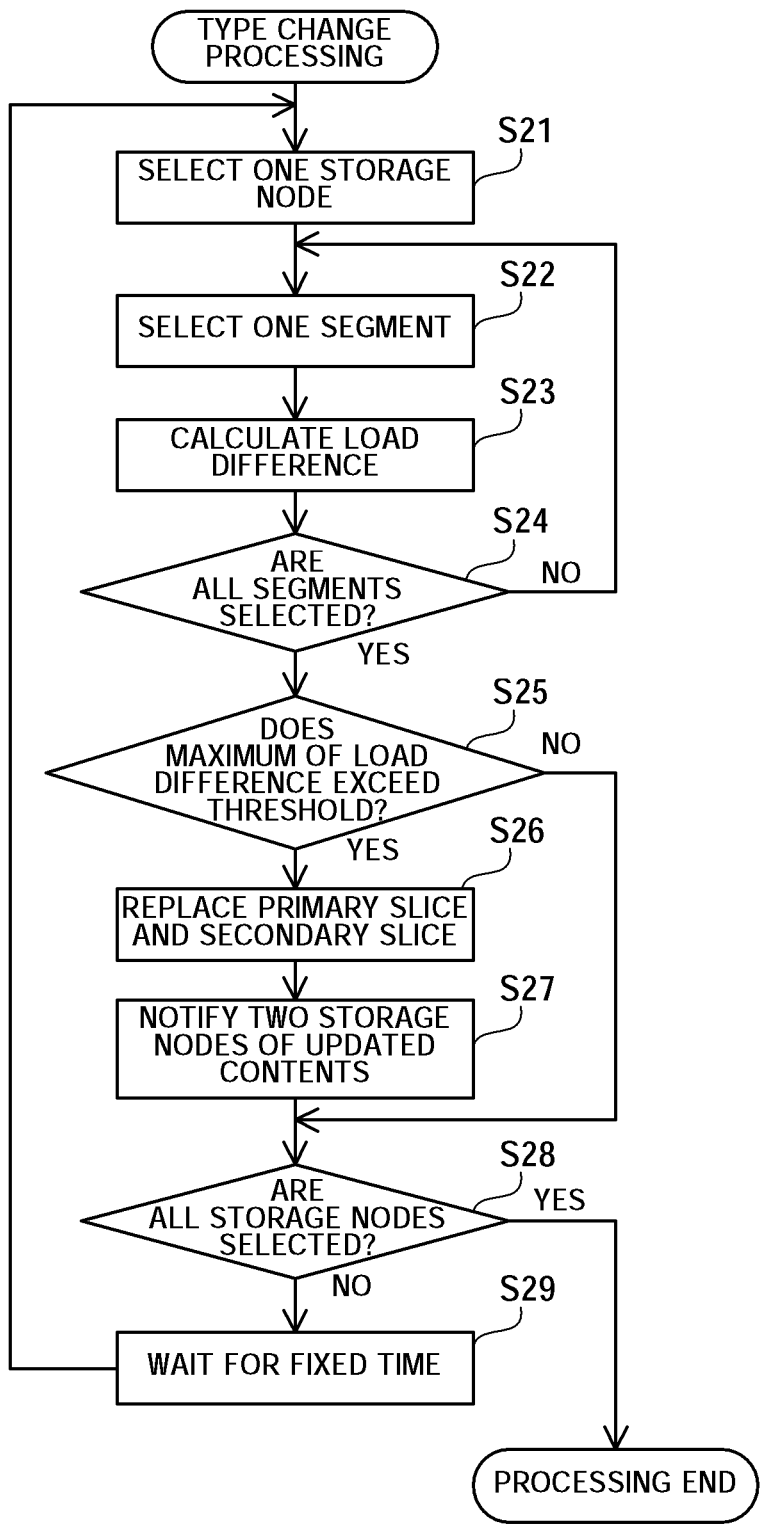
FIG. 12 is a flowchart illustrating a procedure of second type change processing.

FIG. 12 is a flowchart illustrating a procedure of a second type change processing. This type change processing is periodically performed by the type changing unit 550. Processing illustrated in FIG. 12 will be described below along the step numbers.

[Step S21] The type changing unit 550 selects one storage node with reference to the logical volume table 511 stored in the logical volume storing unit 510.

[Step S22] With reference to the logical volume, the type changing unit 550 selects one segment in which its primary slice or secondary slice is assigned to the storage node selected in step S21.

[Step S23] With reference to the load information table 521 stored in the load information storing unit 520, the type changing unit 550 calculates a load difference between a storage node as the assignment destination of a primary slice and that of a secondary slice of the segment selected in step S22. When a load of the storage node as the assignment destination of the secondary slice is higher than that of the primary slice, a load difference is assumed to be zero.

[Step S24] The type changing unit 550 determines whether to select all segments having the condition in step S22. If YES, the process goes to step S25. If NO, the process returns to step S22.

[Step S25] The type changing unit 550 determines whether the maximum of the load difference calculated in step S23 exceeds a predetermined threshold. If YES, the process goes to step S26. If NO, the process goes to step S28.

[Step S26] The type changing unit 550 updates the logical volume table 511, and replaces a slice type between a primary slice and secondary slice of a segment whose load difference calculated in step S23 is maximized.

[Step S27] The logical volume management unit 530 detects that the logical volume table 511 is updated, and notifies an updated content to two storage nodes that manage the respective primary slice and secondary slice replaced in step S26.

[Step S28] The type changing unit 550 determines whether to select all storage nodes in step S21. If YES, the process is ended. If NO, the process goes to step S29.

[Step S29] The type changing unit 550 waits for a fixed time. Thereafter, the process returns to step S21.

In step S21, a storage node may be selected in descending order or ascending order of load.

Thus, the type changing unit 550 sequentially confirms storage nodes, and replaces slice types of a primary slice and a secondary slice in the following case. That is, a segment is present such that a load difference between a storage node assigned with a primary slice and that assigned with a secondary slice exceeds a predetermined allowable value. As a result, even if a segment is absent such that its primary slice is assigned to the maximum load storage node and its secondary slice is assigned to the minimum load storage node, a processing load can be dispersed.

Figure 13:
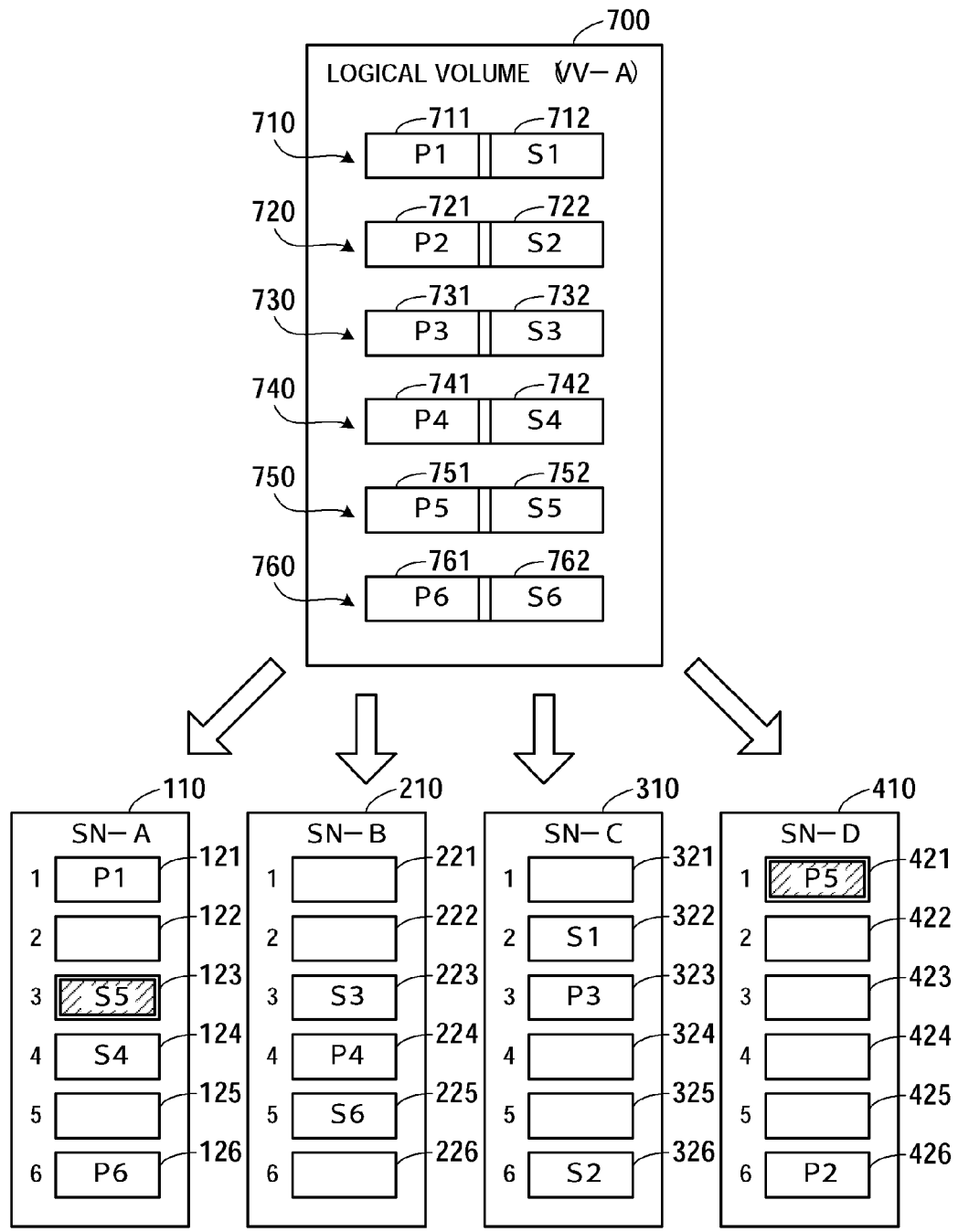
FIG. 13 is a second schematic diagram illustrating a data structure of a logical volume.

FIG. 13 is a second schematic diagram illustrating a data structure of the logical volume 700. As a result of the above-described type change processing, the assignment status of primary slices and secondary slices illustrated in FIG. 5 is changed to the assignment status illustrated in FIG. 13. In the example of FIG. 13, a primary slice and secondary slice of a segment 750 are replaced. Specifically, before the replacement of slice type, a primary slice 751 is assigned to the storage device 110, and a secondary slice 752 is assigned to the storage device 410. After the replacement of slice type, the primary slice 751 is assigned to the storage device 410, and the secondary slice 752 is assigned to the storage device 110. This enables to reduce a processing load of the storage node 100.

Next, processing will be described wherein no primary slice is assigned to a storage device under the rearrangement to prevent deterioration of response performance.

Figure 14:
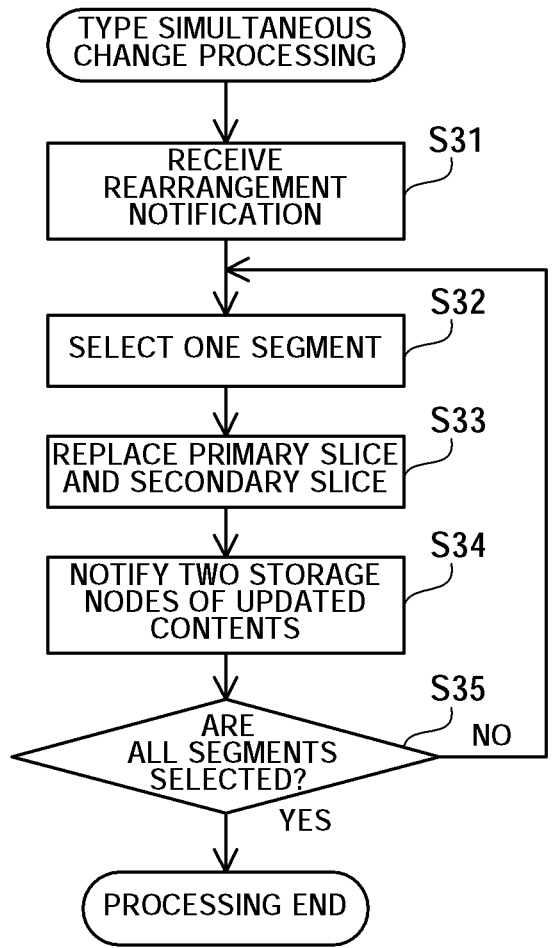
FIG. 14 is a flowchart illustrating a procedure of a type simultaneous change processing.

FIG. 14 is a flowchart illustrating a procedure of a type simultaneous change processing. Processing illustrated in FIG. 14 will be described below along the step numbers.

[Step S31] When receiving a notification indicating a start of the rearrangement from any one of the storage nodes 100, 200, 300, and 400, the logical volume management unit 530 stores information indicating the start of rearrangement in the load information storing unit 520.

[Step S32] With reference to the logical volume table 511 stored in the logical volume storing unit 510, the type changing unit 550 selects one segment whose primary slice is assigned to a storage node under the rearrangement.

[Step S33] The type changing unit 550 updates the logical volume table 511, and replaces a slice type between a primary slice and secondary slice of the segment selected in step S32.

[Step S34] The logical volume management unit 530 detects that the logical volume table 511 is updated, and notifies an updated content to two storage nodes that manage the respective primary slice and secondary slice replaced in step S33.

[Step S35] The type changing unit 550 determines whether to select all segments having the condition in step S32. If YES, the process is ended. If NO, the process returns to step S32.

Thus, the type changing unit 550 changes all the primary slices assigned to a storage node under the rearrangement to the secondary slices. This enables to prevent deterioration of response performance due to rearrangement. After completion of the rearrangement, the type changing unit 550 replaces a primary slice and a secondary slice based on a load status. As a result, a part of access is redirected to a storage node after the rearrangement.

Next, an example of a communication flow when the access node 600 accesses the storage nodes 100, 200, 300, and 400 will be described.

Figure 15:
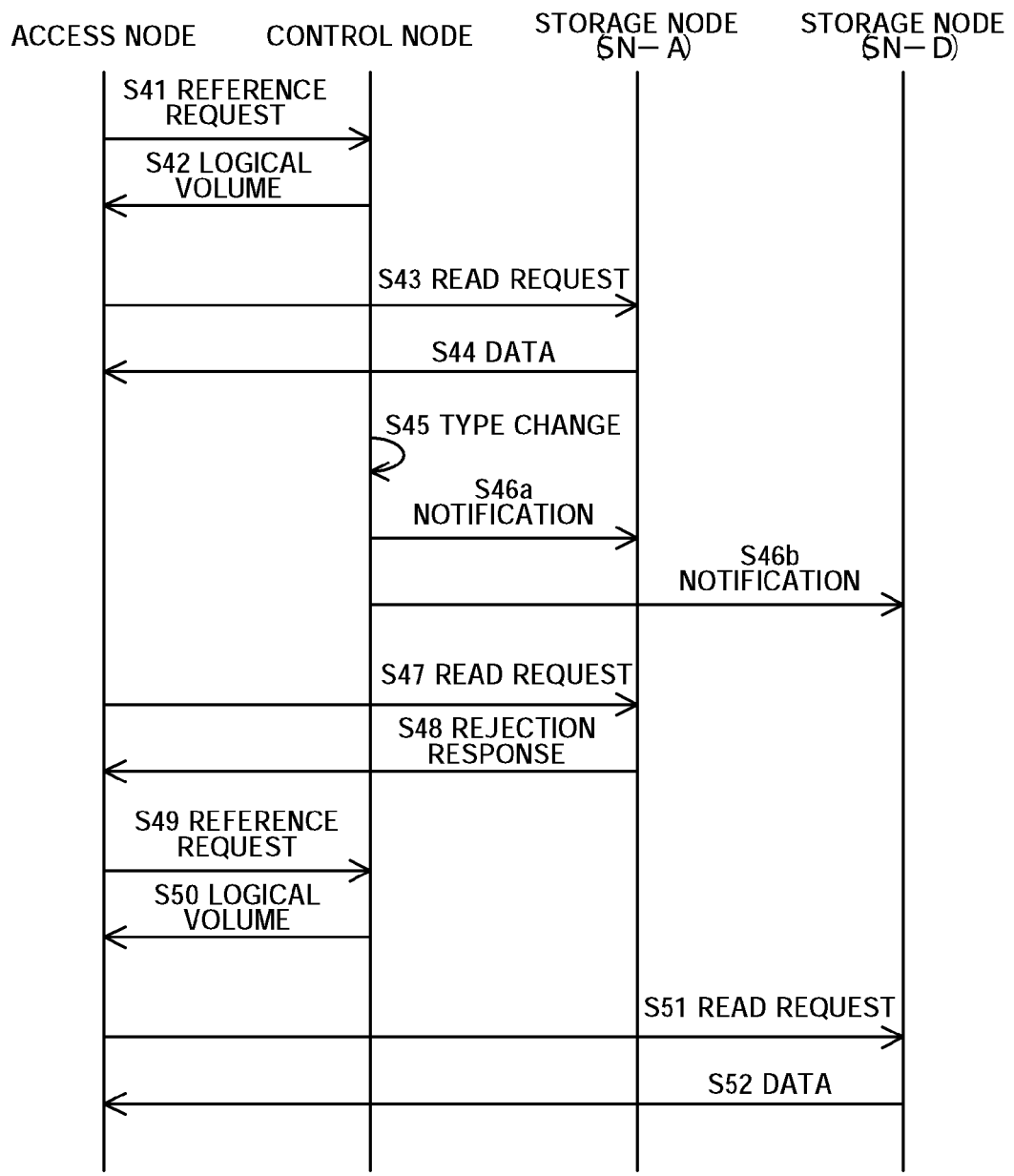
FIG. 15 is a sequence diagram illustrating a flow of a data access from an access node.

FIG. 15 is a sequence diagram illustrating a flow of a data access from the access node 600. Hereinafter, processing illustrated in FIG. 15 will be described along the step numbers.

[Step S41] The access node 600 transmits a reference request to the control node 500.

[Step S42] In response to the reference request, the control node 500 transmits a latest logical volume to the access node 600.

[Step S43] The access node 600 accesses a storage node based on the logical volume acquired in step S42. Here, the access node 600 transmits a read request to the storage node 100.

[Step S44] In response to the read request, the storage node 100 acquires data from the storage device 110, and transmits the acquired data to the access node 600.

[Step S45] The control node 500 replaces a primary slice and secondary slice of a certain segment in order to distribute loads among storage nodes. Here, suppose that the control node 500 replaces a primary slice and secondary slice of a segment having data read by the access node 600 in step S43.

[Step S46a] To the storage node 100 assigned with a primary slice before the replacement, the control node 500 transmits a notification indicating that the type of a slice is changed to a secondary slice.

[Step S46b] To a storage node assigned with a secondary slice before the replacement, the control node 500 transmits a notification indicating that the type of a slice is changed to a primary slice. Here, suppose that a storage node assigned with a secondary slice before the replacement is the storage node 400.

[Step S47] Based on the logical volume acquired in step S42, the access node 600 rereads the data read in step S43. Specifically, the access node 600 transmits the read request to the storage node 100.

[Step S48] Since a slice having data indicated by the read request is a secondary slice, the storage node 100 transmits a request rejection notification back to the access node 600.

[Step S49] The access node 600 transmits a reference request to the control node 500.

[Step S50] In response to the reference request, the control node 500 transmits a latest logical volume to the access node 600.

[Step S51] The access node 600 transmits a read request to the storage node 400 based on the logical volume acquired in step S50.

[Step S52] In response to the read request, the storage node 400 acquires data from the storage device 410, and transmits the acquired data to the access node 600.

Thus, the access node 600 acquires a logical volume from the control node 500, and identifies a storage node as an access destination based on the acquired logical volume.

Here, suppose that when the control node 500 replaces a primary slice and a secondary slice, the access node 600 fails to access a storage node. In this case, the access node 600 reacquires a latest logical volume from the control node 500, and retries to access the storage node.

According to the above-described distributed storage system, when a load difference between a storage node assigned with a primary slice used as an access destination and a storage node assigned with a secondary slice used as a backup exceeds an allowable value, the primary slice and the secondary slice are automatically replaced.

As a result, without moving data, a storage node as an access destination of the data is changed. At this time, an access destination is not necessarily determined in units of access requests. Accordingly, this prevents a response from delaying due to load distribution processing itself, so that a response performance of the distributed storage system can be surely improved. A status of data allocation is managed not in units of files but in units of slices divided based on a size of a storage area, so that a mechanism for managing the status of data allocation becomes simple.

Further, when no primary slice is assigned to a storage device under rearrangement, occurrence of accesses can be prevented as much as possible. This enables to prevent deterioration of response performance.

The storage management program, storage management apparatus, and storage management method according to the present invention have been described above with reference to the embodiment illustrated in the drawings. However, the present invention is not limited thereto, and the configuration of each unit may be replaced with any one having the similar function. Further, any other constituent component or step may be added to the present invention. Further, the present invention is also implemented by the combination of any two or more configurations (features) described in the above embodiment.

The above-described processing functions can be implemented by a computer. In this case, a program is provided which describes the processing content of functions to be provided in the storage nodes 100, 200, 300, and 400, the control node 500, and the access node 600. The processing functions can be implemented on the computer by executing the program on the computer. The program which describes the processing content can be recorded in a computer readable recording medium. The computer readable recording medium includes a magnetic recording device, an optical disk, an optical magnetic recording medium and a semiconductor memory. The magnetic recording device includes a hard disk drive (HDD), a flexible disk (FD), and a magnetic tape (MT). The optical disk includes a DVD (Digital Versatile Disk), a DVD-RAM, a CD-ROM (Compact Disk Read Only Memory), and a CD-R (Recordable)/RW (ReWritable). The optical magnetic recording medium includes an MO (Magneto-Optical Disk).

In order to distribute the program, a portable recording medium such as a DVD or CD-ROM having recorded thereon the program is sold. Also, the program may be stored in a storage device of a server computer to enable the program to be transferred from the server computer via a network to another computer.

The computer, which executes the program, stores in its own storage device, for example, the program recorded in a portable recording medium or the program transferred from the server computer. Then, the computer reads the program from its own storage device and executes processing based on the program. Here, the computer may also read the program directly from the portable recording medium to execute the processing based on the program; or alternatively, each time the program is transferred from the server computer, the computer may execute processing based on the received program.

In the present invention, when a load difference between a storage node as the allocation destination of the main-data used as an access destination and a storage node as the allocation destination of the sub-data used as a backup exceeds a predetermined allowable value, setting is changed to replace roles of the main-data and the sub-data. As a result, without moving data, a storage node as the access destination of the data is changed. At this time, an access destination is not necessarily determined in units of access requests. Accordingly, this prevents a response from delaying due to load distribution processing itself, so that a response performance of the distributed storage system can be surely improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that various changes, substitutions and alterations could be made hereto without departing from the spirit and scope of the invention.

What is claimed is:

1. A computer-readable, non-transitory recording medium which records a storage management program for managing a data allocation status of a distributed storage system that distributes and allocates a plurality of data blocks having a same content to a plurality of storage nodes connected via a network, the program causing a computer to perform a procedure comprising:

designating, from the data blocks having the same content, main-data used as an access destination and sub-data used as a backup, and storing management information that registers the storage nodes as allocation destinations of the respective main-data and sub-data;

collecting load information on the storage nodes;

detecting as a replacement object a pair of the main-data and the sub-data having the same content based on the management information and the collected load information, the pair of the main-data and the sub-data having a condition such that a load difference between a storage node storing the main-data and a storage node storing the sub-data exceeds a predetermined allowable value;

updating the management information so as to replace roles of the main-data and the sub-data between the detected pair of data blocks; and transmitting, upon receiving a request for the management information from an access node, the updated management information to the access node, wherein the access node accesses one of the data blocks stored in a storage node among the storage nodes, and when said one of the data blocks is the sub-data and an access to said one of the data blocks is rejected by the accessed storage node, transmits the request to the computer and accesses another one of the data blocks stored in another storage node among the storage nodes based on the updated management information received in response to the request.

2. The computer readable, non-transitory recording medium according to claim 1, wherein:
the procedure further comprises determining whether a load difference between a maximum load node and a minimum load node among the storage nodes exceeds the predetermined allowable value, and
the detecting detects, when the load difference exceeds the predetermined allowable value, a pair of the main-data allocated to the maximum load node and the sub-data allocated to the minimum load node as a candidate for an replacement object.

3. The computer readable, non-transitory recording medium according to claim 1, wherein:
the detecting continuously performs replacement object detection processing at predetermined time intervals.

4. The computer readable, non-transitory recording medium according to claim 1, wherein:
in the management information, an address space of a logical volume used for identification of data is divided into a plurality of logical segments, and the data blocks having the same content are managed in units of the logical segments, and
the updating replaces roles of the main-data and the sub-data in units of the logical segments.

5. The computer readable, non-transitory recording medium according to claim 1, wherein:
the procedure further comprises receiving from any one of the storage nodes a notification indicating a start of rearrangement of data blocks allocated to the storage node, and
the detecting identifies, when the notification is received, all the main-data blocks allocated to the storage node as a notification source, and detects as an replacement object a pair of the identified main-data and sub-data having the same content as that of the main-data, regardless of a load size.

6. The computer readable, non-transitory recording medium according to claim 1, wherein the procedure further comprises notifying the storage nodes of an updated content after the management information is updated, the storage nodes being registered as allocation destinations of data blocks whose roles are replaced.

7. A storage management apparatus for managing a data allocation status of a distributed storage system that distributes and allocates a plurality of data blocks having a same content to a plurality of storage nodes connected via a network, the storage management apparatus comprising:
a management information storing unit which designates, from the data blocks having the same content, main-data used as an access destination and sub-data used as a backup, and stores management information that registers the storage nodes as allocation destinations of the respective main-data and sub-data;
a load information collecting unit which continuously collects load information on the storage nodes;
a replacement object detecting unit which detects as a replacement object a pair of the main-data and the sub-data having the same content based on the management information stored in the management information storing unit and the load information collected by the load information collecting unit, the pair of the main-data and the sub-data having a condition such that a load difference between a storage node storing the main-data and a storage node storing the sub-data exceeds a predetermined allowable value;
a management information updating unit which updates the management information stored in the management information storing unit so as to replace roles of the main-data and the sub-data between the pair of data blocks detected by the replacement object detecting unit; and
a transmitter which transmits, upon receiving a request for the management information from an access node, the updated management information to the access node, wherein the access node accesses one of the data blocks stored in a storage node among the storage nodes, and when said one of the data blocks is the sub-data and an access to said one of the data blocks is rejected by the accessed storage node, transmits the request to the storage management apparatus and accesses another one of the data blocks stored in another storage node among the storage nodes based on the updated management information received in response to the request.

8. The storage management apparatus according to claim 7, wherein:
the replacement object detecting unit determines whether a load difference between a maximum load node and a minimum load node among the storage nodes exceeds the predetermined allowable value, and detects, when the load difference exceeds the predetermined allowable value, a pair of the main-data allocated to the maximum load node and the sub-data allocated to the minimum load node as a candidate for a replacement object.

9. The storage management apparatus according to claim 7, wherein:
the replacement object detecting unit continuously performs replacement object detection processing at predetermined time intervals.

10. The storage management apparatus according to claim 7, wherein:
in the management information, an address space of a logical volume used for identification of data is divided into a plurality of logical segments, and the data blocks having the same content are managed in units of the logical segments, and
the management information updating unit replaces roles of the main-data and the sub-data in units of the logical segments.

11. The storage management apparatus according to claim 7, further comprising a notification receiving unit which receives from any one of the storage nodes a notification indicating a start of rearrangement of data blocks allocated to the storage node, wherein:
the replacement object detecting unit identifies, when the notification receiving unit receives the notification, all the main-data blocks allocated to the storage node as a notification source, and detects as a replacement object a pair of the identified main-data and sub-data having the same content as that of the main-data, regardless of a load size.

12. The storage management apparatus according to claim 7, further comprising an updated content notifying unit which notifies the storage nodes of an updated content after the management information updating unit updates the management information, the storage nodes being registered as allocation destinations of data blocks whose roles are replaced.

13. A storage management method for causing a computer to manage a data allocation status of a distributed storage system that distributes and allocates a plurality of data blocks having a same content to a plurality of storage nodes connected via a network, the method comprising:
designating, from the data blocks having the same content, main-data used as an access destination and sub-data used as a backup, and storing management information that registers the storage nodes as allocation destinations of the respective main-data and sub-data;

collecting load information on the storage nodes;

detecting as a replacement object a pair of the main-data and the sub-data having the same content based on the management information and the collected load information, the pair of the main-data and the sub-data having a condition such that a load difference between a storage node storing the main-data and a storage node storing the sub-data exceeds a predetermined allowable value;

updating the management information so as to replace roles of the main-data and the sub-data between the detected pair of data blocks; and transmitting, upon receiving a request for the management information from an access node, the updated management information to the access node, wherein the access node accesses one of the data blocks stored in a storage node among the storage nodes, and when said one of the data blocks is the sub-data and an access to said one of the data blocks is rejected by the accessed storage node, transmits the request to the computer and accesses another one of the data blocks stored in another storage node among the storage nodes based on the updated management information received in response to the request.

14. The storage management method according to claim 13, wherein:

the storage management method further comprises determining whether a load difference between a maximum load node and a minimum load node among the storage nodes exceeds the predetermined allowable value, and the detecting detects, when the load difference exceeds the predetermined allowable value, a pair of the main-data allocated to the maximum load node and the sub-data allocated to the minimum load node as a candidate for a replacement object.

15. The storage management method according to claim 13, wherein:

the detecting continuously performs replacement object detection processing at predetermined time intervals.

16. The storage management method according to claim 13, wherein:

in the management information, an address space of a logical volume used for identification of data is divided into a plurality of logical segments, and the data blocks having the same content are managed in units of the logical segments, and the updating replaces roles of the main-data and the sub-data in units of the logical segments.

17. The storage management method according to claim 13, further comprising receiving from any one of the storage nodes a notification indicating a start of rearrangement of data blocks allocated to the storage node, wherein:

the detecting identifies, when the notification is received, all the main-data blocks allocated to the storage node as a notification source, and detects as a replacement object a pair of the identified main-data and sub-data having the same content as that of the main-data, regardless of a load size.

18. The storage management method according to claim 13, further comprising notifying the storage nodes of an updated content after the management information is updated, the storage nodes being registered as allocation destinations of data blocks whose roles are replaced.

* * * * *